US009960605B2

(12) United States Patent
Voelkel et al.

(10) Patent No.: US 9,960,605 B2
(45) Date of Patent: May 1, 2018

(54) CIRCUIT ARRANGEMENT FOR TRANSFERRING ENERGY

(71) Applicant: Bayerische Motoren Werke Aktiengesellschaft, Munich (DE)

(72) Inventors: Holger Voelkel, Munich (DE); Roman Mayr, Gilching (DE); Michael Schulz, Munich (DE); Christian Epp, Schongau (DE); Michael Wahl, Siegen (DE); Rainer Brueck, Lippstadt (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 257 days.

(21) Appl. No.: 14/884,093

(22) Filed: Oct. 15, 2015

(65) Prior Publication Data

US 2016/0036239 A1 Feb. 4, 2016

Related U.S. Application Data

(63) Continuation of application No. PCT/EP2014/057641, filed on Apr. 15, 2014.

(30) Foreign Application Priority Data

Apr. 16, 2013 (DE) ........................ 10 2013 206 765

(51) Int. Cl.
*H02J 4/00* (2006.01)
*H02M 3/07* (2006.01)
*H02M 3/335* (2006.01)

(52) U.S. Cl.
CPC ................. *H02J 4/00* (2013.01); *H02M 3/07* (2013.01); *H02M 3/33523* (2013.01)

(58) Field of Classification Search
CPC .. H02J 50/12; H02J 7/025; H02J 50/80; H02J 50/10; H02J 1/10; H02J 1/00; H02J 5/005; H02J 7/04; H02J 7/02

(Continued)

(56) References Cited

U.S. PATENT DOCUMENTS

| 5,345,376 A | 9/1994 | Nourbakhsh |
| 2010/0052565 A1* | 3/2010 | Kitamura ........... H05B 33/0803 |
| | | 315/291 |

FOREIGN PATENT DOCUMENTS

| CN | 102403893 A | 4/2012 |
| DE | 196 31 356 A1 | 2/1998 |

(Continued)

OTHER PUBLICATIONS

International Search Report (PCT/ISA/210) issued in PCT Application No. PCT/EP2014/057641 dated Sep. 29, 2014 with English translation (seven pages).

(Continued)

*Primary Examiner* — John Poos
(74) *Attorney, Agent, or Firm* — Crowell & Moring LLP

(57) ABSTRACT

A circuit arrangement for transferring energy includes an energy source, a control device and an energy distribution network. The energy distribution network has a base element and at least one load element. The base element includes a first intermediate circuit energy storage element which can be electrically connected to or disconnected from the energy source via two first controllable switching elements by way of the control device to form a first energy circuit. The at least one load element includes an energy consumer which can be electrically connected to or disconnected from the connections of the first intermediate circuit energy storage element via two second controllable switching elements by way of the control device to form a second energy circuit. The control device is designed to actuate the first and second switching elements of the respective energy distribution network such that that energy is transferred from the energy source to the energy consumer or the reverse, wherein a direct conductive connection between the energy source and the energy consumer does not exist at any time.

19 Claims, 6 Drawing Sheets

(58) Field of Classification Search
USPC ..................................... 307/38, 39, 40, 41
See application file for complete search history.

(56) References Cited

FOREIGN PATENT DOCUMENTS

| | | |
|---|---|---|
| EP | 0 386 261 A1 | 9/1990 |
| JP | 58-58863 A | 4/1983 |
| JP | 2011-223668 A | 11/2011 |

OTHER PUBLICATIONS

German Search Report issued in counterpart German Application No. 10 2013 206765.8 dated Dec. 16, 2013 with partial English translation (nine pages).

Wikipedia Artikel "Inverswandler" veroeffentlichte Version vom, Feb. 26, 2013, one page, http://de.wikipedia.org/w/index.php?title=Inverswandler&oldid=11470.

Chinese-language Office Action issued in counterpart Chinese Application No. 201480021072.2 dated Feb. 17, 2017 with English translation (Sixteen (16) pages).

* cited by examiner

CIRCUIT ARRANGEMENT FOR TRANSFERRING ENERGY

CROSS REFERENCE TO RELATED APPLICATIONS

This application is a continuation of PCT International Application No. PCT/EP2014/057641, filed Apr. 15, 2014, which claims priority under 35 U.S.C. § 119 from German Patent Application No. 10 2013 206 765.8, filed Apr. 16, 2013, the entire disclosures of which are herein expressly incorporated by reference.

BACKGROUND AND SUMMARY OF THE INVENTION

The invention relates to a circuit arrangement for transferring energy.

In order to electrically insulate two circuits from one another, it is known to couple the two circuits via a transformer. In this case, an energy transfer takes place in AC operation. If an energy source only provides a DC voltage, an inverter circuit must be provided on the primary side, which inverter circuit converts the DC voltage into AC voltage. Correspondingly, it is necessary to convert the AC voltage into a DC voltage on the secondary side if the consumer is to be driven using DC voltage. The provision of the transformer and the possibly necessary converter devices is associated with a high demand on installation space. Alternatively, electrical insulation between two circuits can be achieved by a primary-clocked switched-mode power supply with a so-called isolating transformer. This also requires a relatively large installation space.

The two variants require a high complexity in terms of circuitry, as a result of which an expensive demand on space is required. Likewise, a high weight results from the known designs. Another disadvantage consists in that the energy transfer in both cases is frequency-limited.

The problem addressed by the present invention is to provide a circuit arrangement for transferring energy, which is structurally and/or functionally improved, with the result that it requires a comparatively smaller installation space.

This problem is solved by a circuit arrangement for transferring energy comprising an energy source, a control device and at least one energy distribution system. Each energy distribution system comprises a basic element and at least one load element. The basic element comprises the first intermediate circuit element which is electrically connectable to or disconnectable from the energy source via the first pair of controllable switch elements, controlled by the control device to form a first energy circuit. The at least one load element comprises a consumer which is electrically connectable to or disconnectable from the connections of the first intermediate circuit energy storage element via the second pair of controllable switch elements, controlled by the control device to form a second energy circuit. The control device is designed to actuate the first and second switch elements of the respective energy distribution system such that energy is transferred from the energy source to the energy consumer or vice versa, wherein at no time is there a direct conducting connection between the energy source and the energy consumer.

As a result of this, it is possible to optionally convert voltage or current between the energy source and the consumer. The control device ensures that the two energy circuits and thus the energy producer and the energy consumer are galvanically separated at all times. The energy transfer is in this system based on one or—as will become apparent from the following description—a plurality of intermediate circuit energy storage elements which are not transformers in accordance to this invention. One advantage of the circuit arrangement consists in that it has a lower weight and a reduced demand on space in comparison with a transformer or a primary-clocked switched-mode power supply. In particular, the circuit arrangement can be produced at a low installation height and a small space. Cost advantages result from this. Furthermore, the circuit arrangement can also be operated at high switching frequencies. A transformer is usually limited to about 200 kHz. The proposed arrangement can be operated at frequencies in the upper megahertz range.

According to the configuration, one or more energy distribution systems can have at least one intermediate element which is or are connected between the basic element and the at least one load element. Each intermediate element comprises a second intermediate circuit energy storage element, wherein each second intermediate circuit energy storage element is electrically connectable to or disconnectable from the two connections of the respectively preceding first or second intermediate circuit energy storage element or the respectively subsequent second intermediate circuit energy storage element or the at least one energy consumer via a pair of controllable switch elements, which are controlled by the control device to form a respective second energy circuit. As a result of this, a chain of energy circuits can be formed between the energy source and the consumer, along which the energy packets can be transported in an electrically isolated manner from the energy source and the consumer.

In a specific implementation, two or more intermediate elements can be connected in parallel with the basic element or a preceding intermediate element. It is alternatively or additionally possible to connect two or more load elements in parallel with the basic element or with one of the intermediate elements. The provision of at least one intermediate element has the advantage, compared to the direct connection of the load element to the basic element, that the consumer of a load element can be continuously supplied with energy.

Furthermore, by providing one or more intermediate elements, any energy distribution network can be formed, and so a plurality of consumers can be supplied with energy from the energy source.

The energy source can be designed as a current source or voltage source, as desired.

In another expedient configuration, a switch element can be connected in parallel with the first intermediate energy storage element, if this is implemented as an inductance. If intermediate elements are present, it is also possible for a respective switch element to be connected in parallel with at least one of the second intermediate circuit energy storage elements. Voltage peaks are reduced and the energy balance is optimized owing to the switch element, appropriately controlled, in parallel to the energy storage elements.

Another variant of the circuit arrangement provides that at least two energy distribution systems are connected in parallel with the energy source. By way of example, the voltages and/or currents provided in the energy distribution systems for supplying different consumers can be of different levels.

When multiple energy distribution systems are connected in parallel, it is expedient for the first intermediate circuit energy storage elements of the basic element of the at least two energy distribution systems to be electrically connected to the energy source at different times. One advantage consists in that the energy source can be evenly loaded as a result of this. If energy is fed into a first energy distribution system at a particular instant, the respective basic element of the further energy distribution system or systems isolates the electrical connection to the energy source. If the first energy distribution system is then isolated from the energy source, with the result that the energy packet stored in the basic element can be transported to the next energy circuit, the next energy distribution system (that is to say the basic element thereof) is then connected to the energy source, etc.

According to another expedient configuration, the control device is designed to switch the connection between the energy source and the energy consumer by selective actuation of the pair of switches of the basic element, the optional intermediate element and the load element to be conducting and blocking such that, at any given instant, at least one of the pairs of switches is blocking As a result of this, the electrical insulation between the energy source and the consumer is ensured at all times. The electrical insulation is thus enabled solely by the controllable switch elements.

In another configuration, the control device is designed to switch the connection between the energy source and the energy consumer by selective actuation of the pair of switches of the basic element, the optional intermediate element and the load element to be conducting and blocking such that an energy packet is transferrable from the energy source via the first intermediate circuit storage element and the optional second intermediate circuit storage element or storage elements to the energy consumer, or vice versa. As a result of this, despite electrical insulation between the energy source and the consumer, the supply of energy to the consumer is ensured.

According to another configuration, the direction of the energy transport between the energy circuits can be reversed as desired by dynamic matching of the actuation of the pair of switches of the basic element, the optional intermediate element and the load element by the control device. This is important, for example, when using the circuit arrangement in a vehicle if the consumer is able to be operated in an energy-recovery mode. The energy obtained in this case can then—by appropriate actuation of the respective pair of switches—be transferred from the load element via one or more optional intermediate element or elements and via the basic element to the energy source, for example a rechargeable battery, which is then an energy sink in this mode.

According to another configuration, the first intermediate circuit energy storage element and/or the at least one second optional intermediate circuit energy storage element of a respective intermediate element comprise, in each case, at least of one inductance and/or a capacitor, as a result of which, with appropriate actuation of the switch elements, each intermediate circuit energy storage element of the following energy circuit can be charged and discharged in sequence until the energy consumer is supplied with energy. This principle can also be used in the opposite direction, as explained.

The load element can include at least one energy storage element in addition to the energy consumer. If the load element, as in its basic form, has only one energy consumer, then the consumer can also be supplied with energy intermittently. In contrast, by way of the energy storage element in the load element, it is possible to continuously supply the energy consumer with energy.

In a variant, the energy storage element of the load element can be an inductance which is connected in series with the consumer, wherein the series circuit composed of the energy storage element inductance and the consumer is connected in parallel with a fourth switch element. In another variant, the energy storage element of the load element can be a charge store which is connected in parallel with the consumer.

The energy storage element can also be formed from a combination of one or more inductances and one or more capacitors.

If the controllable switch elements of the preceding energy circuit (either of the basic element or of an intermediate element) are closed, then the energy contained in the associated intermediate circuit energy storage element can be output to the energy storage element of the load element. The consumer is then supplied from the energy storage element.

According to another configuration, the first and the second pairs of switch elements are semiconductor switch elements. In particular, they are MOSFETs (metal-oxide-semiconductor field-effect transistor) or HEMTs (high-electron-mobility transistor). In order to be able to achieve particularly high switching frequencies at low losses, it is expedient for the semiconductor switch elements to be formed from gallium nitride (GaN) or silicon carbide (SiC), that is to say a so-called wide-bandgap material.

Other objects, advantages and novel features of the present invention will become apparent from the following detailed description of one or more preferred embodiments when considered in conjunction with the accompanying drawings.

DETAILED DESCRIPTION OF THE DRAWINGS

Figure 1:
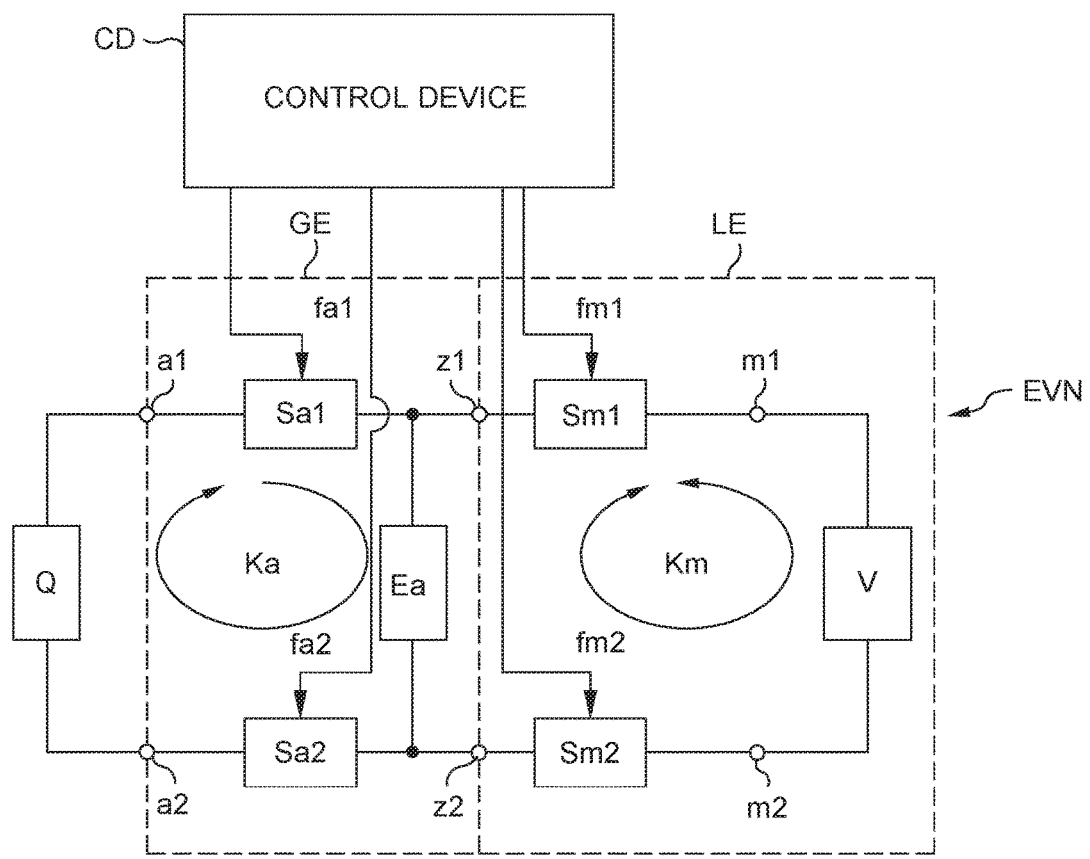
FIG. 1 is a schematic illustration of a circuit arrangement according to an embodiment of the invention for transferring energy, wherein this is formed by way of example from a basic element and a load element.

FIG. 1 is a schematic illustration of a single energy distribution system EVN of a circuit arrangement according to an embodiment of the invention for transferring energy, wherein the energy distribution system EVN comprises, by way of example, a basic element GE and a load element LE for electrically isolating two energy circuits Ka, Km by way of electronic switches. An energy source Q, which may be present in the form of, for example, a battery or in general as a current source or voltage source, is illustrated connected between terminals a1 and a2. The energy source Q supplies the first energy circuit Ka of the basic element GE with energy. A first intermediate circuit energy storage element Ea, which is connected between terminals z1 and z2, is connected via two first switch elements Sa1, Sa2 (a so-called pair of switch elements) to the terminals a1, a2 of the energy source Q. The first switch element Sa1 is connected between the terminal a1 and the first intermediate circuit energy storage element Ea (that is to say the terminal z1); the second switch element Sa2 is connected between the terminal a2 and the first intermediate circuit energy storage element Ea (that is to say the terminal z2). The terminals z1 and z2 are the output terminals of the basic element GE.

The second energy circuit Km of the load element LE comprises, in addition to the first intermediate circuit energy storage element Ea of the basic element, two second switch elements Sm1, Sm2 (another pair of switch elements) and an energy consumer (consumer) V. The consumer V is connected to terminals m1 and m2. The second switch element Sm1 is connected between the terminals m1 and z1. The second switch element Sm2 is connected between the terminals z2 and m2. The terminals z1 and z2 can be considered to be input terminals with reference to the load element LE. They are nodes between the intermediate circuit energy storage element Ea and the respective first and second switch elements.

The first switch elements Sa1, Sa2 and the second switch elements Sm1, Sm2 are actuated by a control device CD via a control signal fa1, fa2 or fm1, fm2, respectively, with the result that the respective switch elements are switched to be electrically conducting (ON) or electrically blocking (OFF) according to the actuation signal. The control signals fm1 and fm2 correspond to one another. Likewise, the control signals fm1 and fm2 correspond to one.

The first and second controllable switch elements Sa1, Sa2, Sm1, Sm2 are preferably semiconductor switch elements of the MOSFET or HEMT type and consist, in particular, of gallium nitride (GaN) or silicon carbide (SiC).

The first intermediate circuit energy storage element Ea can be formed from a combination of inductances and capacitors. The first intermediate circuit energy storage element Ea can also exclusively comprise one or more capacitors or one or more inductances.

Figure 4:
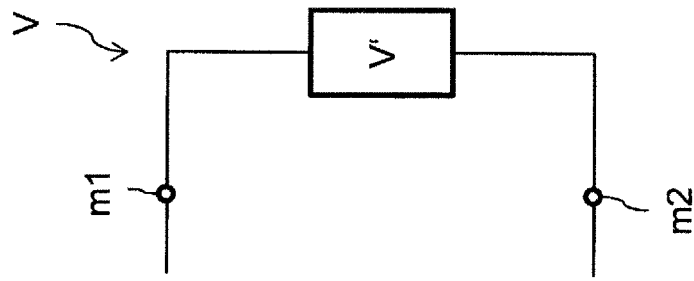
FIGS. 2 to 4 show various configurations of a load element of the circuit arrangement, wherein a pair of switch elements of the load element has been omitted.
Figure 3:
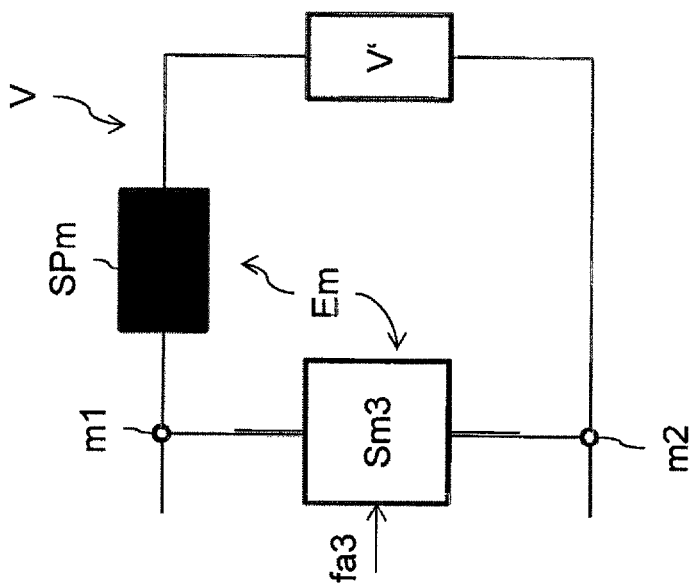
Figure 2:
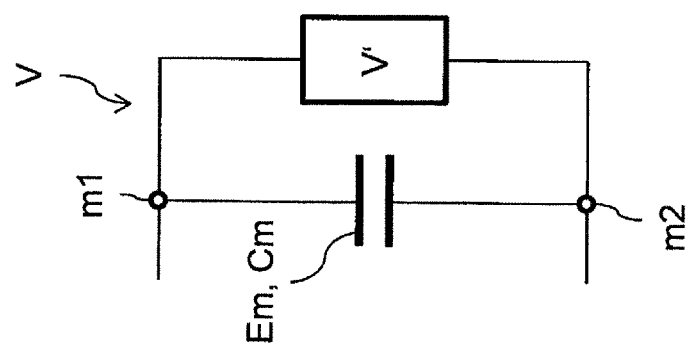

FIGS. 2 to 4 illustrate three different exemplary embodiments of how the energy consumer V may be designed.

According to the first variant, in FIG. 2, an intermediate circuit energy storage element Em in the form of a capacitor Cm is provided in addition to a consumer V'. The capacitor Cm is connected between the terminals m1 and m2 and hence in parallel with the consumer V'.

In the second variant, which is illustrated in FIG. 3 and likewise comprises an intermediate circuit energy storage element Em in addition to the consumer V', the intermediate circuit energy storage element Em is formed from an inductance SPm and a further second switch element Sm3. While the switch element Sm3 is connected between the terminals m1 and m2, the series circuit composed of the inductance SPm and the consumer V' is connected in parallel with the switch element Sm3. The switch element Sm3 has a control signal fa3 applied thereto, which control signal corresponds to the control signals fa1 and fa2 in the case of an energy distribution system as illustrated in FIG. 1.

In the third variant according to FIG. 4, no separate intermediate circuit energy storage element is provided. Instead, only the consumer V (V' corresponds here to the consumer V in FIG. 1) is connected between the terminals m1 and m2.

Whereas the variants illustrated in FIGS. 2 and 3 enable continuous operation for supplying the consumer V', it is also possible for intermittent operation to take place in the case of the variant illustrated in FIG. 4. Intermittent operation, that is to say operation in which the consumer is not continuously supplied with energy is possible in the automotive sector, for example, in the case of operating heated seats or heated windshields without disadvantage for the operation of the consumer.

Figure 5:
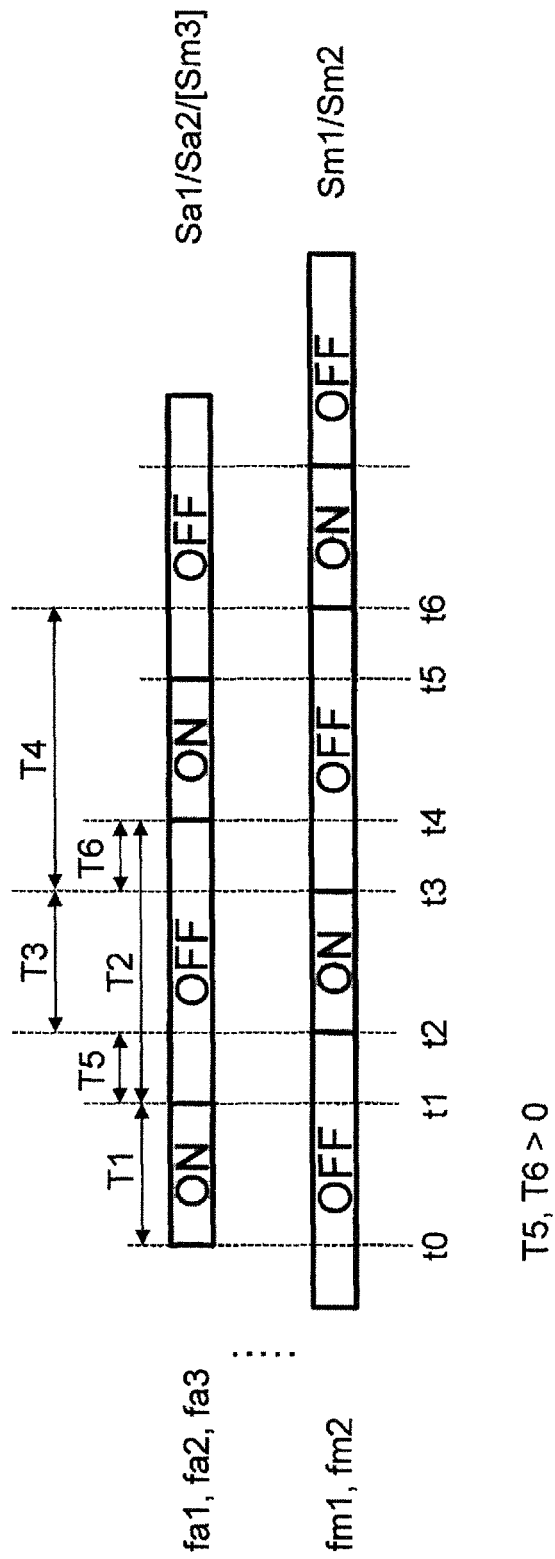
FIG. 5 shows the temporal profile of the actuation of the switch elements contained in the circuit arrangement according to FIG. 1.

FIG. 5 shows a switching sequence for the exemplary embodiment from FIG. 1, with which the first and second switch elements Sa1, Sa2, Sm1, Sm2 and the optionally present switch element Sm3 are actuated by the control device CD of Figure 1 in order to achieve electrical insulation of the energy circuit Ka from the energy circuit Km on this basis. The switching sequence shows the switch signals fa1, fa2 and fm1, fm2 which are already visible in FIG. 1 and—in the event that the switch element Sm3 (cf. FIG. 3) is present—the control signal fa3. The switch signal fa1, fa2, fa3 is used to actuate the first switch element Sa1, Sa2 and the optionally present switch element Sm3. The switch signal fm1, fm2 is used to actuate the second switch element Sm1, Sm2.

In a first period T1, which lasts from a time t0 to a time t1, the switch elements Sa1, Sa2, Sm3 are switched on, that is to say to be conducting, by the switch signal fa1, fa2, fa3. This is denoted in the figure by "ON". In a second period T2, which extends from the time t1 to a time t4, the switch elements Sa1, Sa2, Sm3 are switched off or to be non-conducting. This is denoted by "OFF". The second period T2 lasts longer than the first period T1 in the exemplary embodiment shown. The described switching process is subsequently repeated.

Correspondingly, the second switch elements Sm1, Sm2 are switched on or to be conducting ("ON") during a third period T3, which extends from the time t2 to t3. In a fourth period T4, which lasts from t3 to t6, the second switch elements Sm1, Sm2 are switched off or to be blocking ("OFF"). The described switching process is subsequently repeated.

Merely by way of example, the first period T1 and the third period T3, in which the first switch elements Sa1, Sa2 (and optionally the third switch element Sm3) and the second switch element Sm1, Sm2 are switched to be conducting, have the same length. The same applies to the second and the fourth periods T2, T4. The first switch elements Sa1, Sa2 (and optionally the switch element Sm3) and the second switch elements Sm1, Sm2 are thus in each case alternately switched to be conducting and blocking, wherein, at a given instant, either only the first pair of switch elements Sa1, Sa2 (and optionally the switch element Sm3) or only the second switch elements Sm1, Sm2 are switched to be conducting. The first and the third periods T1, T3 are in this case temporally separated from one another by a first stop period T5. Between the third and the first period T3, T1, there is a second stop period T6, which lasts from t3 to t4, etc. The first and the second stop periods T5, T6 are preferably the same length, wherein this is not compulsory. Owing to the fact that the first and the second stop periods T5, T6 are in each case greater than zero, electrical insulation between the first energy circuit Ka and the second energy circuit Km is ensured. The duration of the stop periods T5, T6 is preferably measured such that, in the case of inductances in the intermediate circuit energy storage elements Ea, Em, no excessive voltage increase, which can lead to destruction of the first and/or second switch elements Sa1, Sa2, Sm3, Sm1, Sm2, can occur. It should also be noted that the illustrated periods T1 to T6 can also deviate from the shown exemplary embodiment. It is important that T5 and T6 are greater than zero so that the electrical isolation is ensured.

Figure 6A:
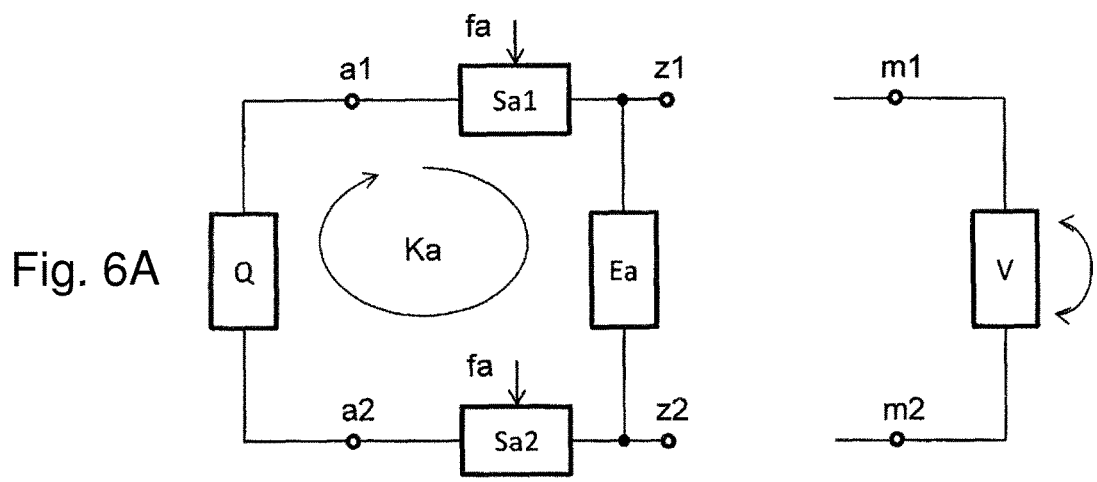
FIG. 6A-6C show the topology of the circuit arrangement from FIG. 1 in the individual phases of the transfer of energy.
Figure 6B:
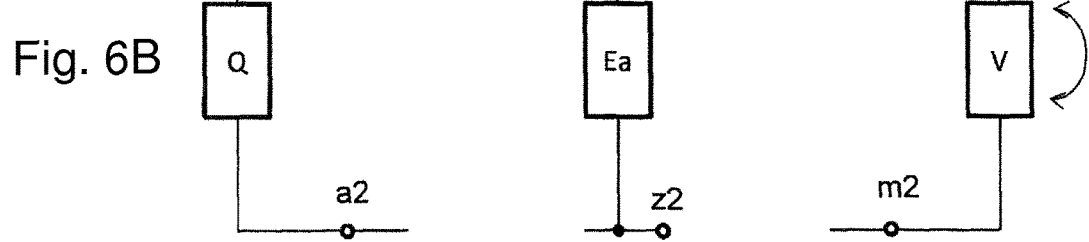
Figure 6C:
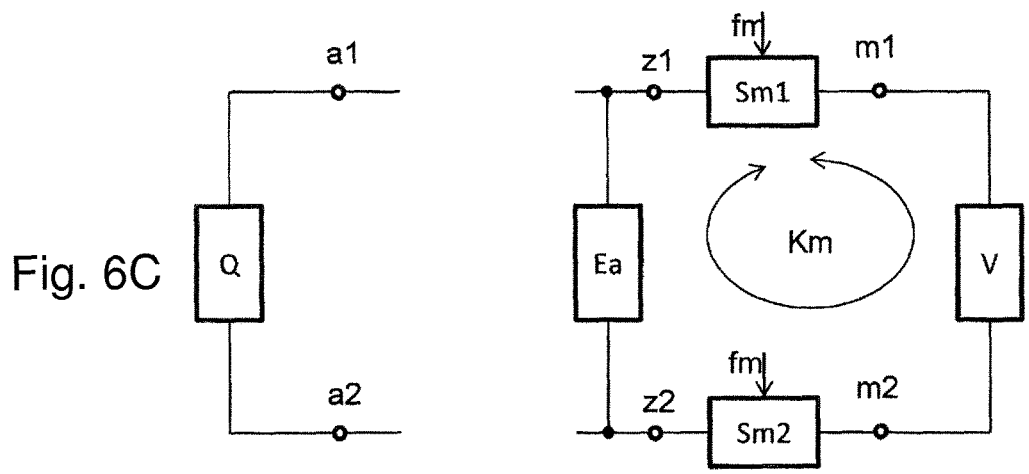

FIGS. 6A-6C show a temporal profile of the mode of operation of the circuit illustrated in FIG. 1. According to the switching sequence illustrated in FIG. 5, firstly (cf. step FIG. 6A)), the first switch elements Sa1, Sa2 (and, if present, the switch element Sm3) are switched to be conducting by way of the control signal fa, which corresponds to the control signals fa1, fa2, fa3. As a result of this, the first intermediate circuit energy storage element Ea is charged from the energy source Q. The situation shown in FIG. 6a therefore happens during the first period T1.

FIG. 6b) illustrates the first stop period T5. During the first stop period, the switch elements Sa1, Sa2, Sm1, Sm2 are switched to be blocking by the control signals fa and fm (wherein fm corresponds to the control signals fm1, fm2), with the result that the first intermediate circuit energy storage element Ea is neither electrically connected to the first energy circuit Ka nor to the second energy circuit K2.

During the third period T3 illustrated in FIG. 6c), the first switch elements Sa1, Sa2 and optionally the switch element Sm3 are switched to be blocking, while the second switch elements Sm1, Sm2 are switched to be conducting by the control signal fm. The first intermediate circuit energy storage element Ea can then discharge while the optionally present intermediate circuit energy storage element Em (cf. the exemplary embodiments of the consumer according to FIGS. 2 and 3) is charged and, in this connection, can ensure a supply of the consumer V (for the example in FIG. 1 in the period T1).

In the next phase (not illustrated in more detail), which corresponds to the second stop period T6, the situation shown in FIG. 6b) applies, in which none of the switch elements is switched to be conducting. The consumer is then supplied from the second intermediate circuit energy storage element. This is indicated by the arrow to the right of the consumer V. Likewise, if the consumer is configured according to either of FIGS. 2 and 3, it is supplied with energy contained in the second intermediate circuit energy storage element Em during the first period T1 (cf. FIG. 6a)), which is likewise indicated by the arrow illustrated to the right of the energy consumer V.

FIGS. 6A-6C illustrate the energy transport from the energy source Q to the consumer V in the direction of the first energy circuit Ka to the energy circuit Km. Energy transport from the energy circuit Km to the first energy circuit Ka is likewise possible, wherein the basic principle of electrical insulation is upheld here, too.

Figure 7:
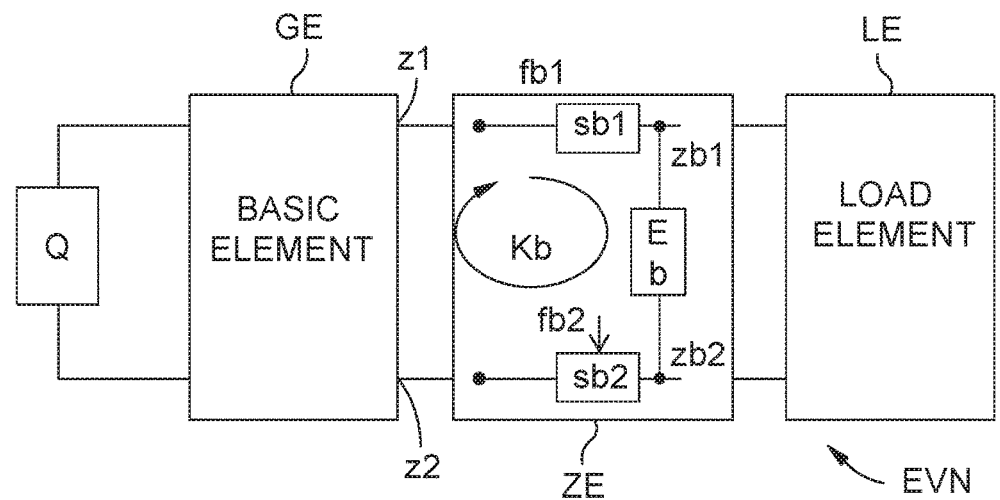
FIG. 7 is a schematic illustration of a circuit arrangement which comprises an intermediate element in addition to the basic element and the load element.

The described circuit arrangement may be modified to the extent that the energy distribution system has one or more intermediate elements ZE in addition to the basic element GE and the load element LE. In the exemplary embodiment illustrated in FIG. 7, such an intermediate element ZE is arranged between the basic element GE and the load element LE. For the sake of clarity, only the switching elements of the intermediate element are illustrated in FIG. 7; the arrangement of the components of the basic element GE and the load element LE corresponds to that of FIG. 1.

An intermediate element ZE has a second intermediate circuit energy storage element Eb and two controllable switch elements Sb1, Sb2 to form a second intermediate circuit Kb. The switch elements Sb1, Sb2 are controlled by way of control signals fb1, fb2, wherein fb1 and fb2 are generally identical. The intermediate circuit energy storage element Eb is connected between connections zb1 and zb2.

The switch element Sb1 is connected between the connection z1 (that is to say an output connection of the basic element GE) and the connection zb1. The switch element Sb2 is connected between the connection z2 (that is to say an output connection of the basic element GE) and the connection zb2.

The control device is designed to switch the connection between the energy source Q and the energy consumer V to be conducting or blocking by selectively actuating the pair of switches of the basic element GE, the intermediate element ZE and the load element LE during operation such that, at any given time, at least one of the pair of switches is blocking, with the result that there is always electrical insulation between the energy source and the energy consumer. As a result of this, by the selective switching of the pairs of switches, an energy packet can be transferred from the energy source Q via the first intermediate circuit store Ea and the further intermediate circuit store Eb to the energy consumer.

In another modification (not illustrated), a plurality of intermediate elements ZE could be connected between the basic element GE and the load element LE, with the result that the energy circuits are connected "in series" with one another in a chain form.

Figure 8:
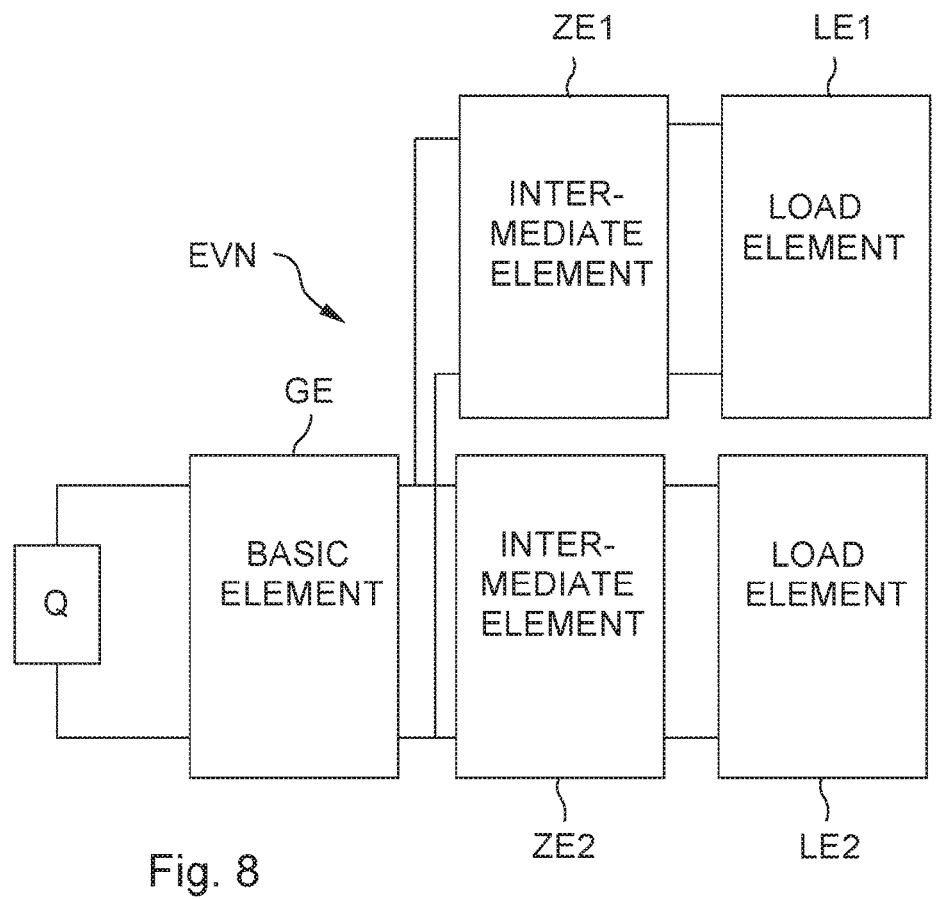
FIG. 8 is a schematic illustration of a circuit arrangement which comprises two intermediate elements connected in parallel with the basic element.

FIG. 8 shows another exemplary embodiment of an energy distribution system EVN, in which two intermediate elements ZE1, ZE2 are connected in parallel with the basic element GE. The intermediate elements ZE1, ZE2 are designed according to the description of FIG. 7. In addition, a respective load element LE1, LE2 is connected to each of the intermediate elements ZE1, ZE2.

In a modification, each of the strings (FIG. 8 shows two strings: GE-ZE1-LE1 and GE-ZE2-LE2) could also comprise a plurality of intermediate elements ZE, which may optionally be connected in series and/or in parallel with one another.

Figure 9:
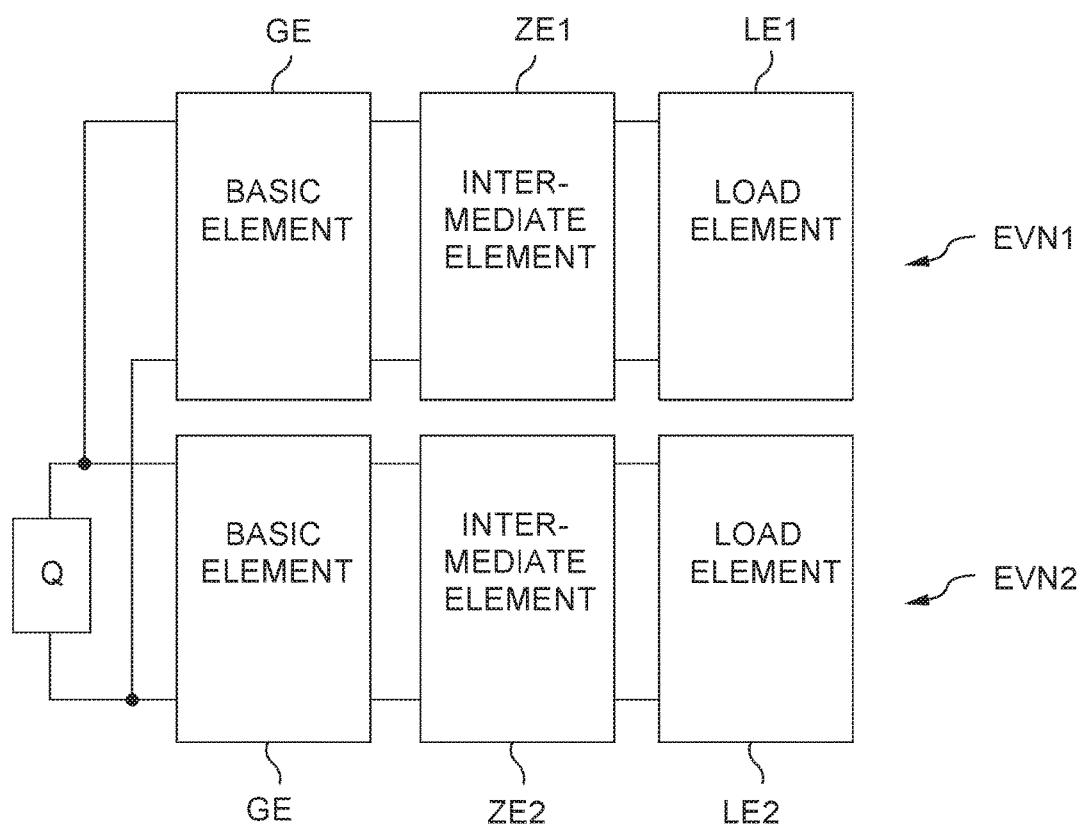
FIG. 9 is a schematic illustration of a circuit arrangement which comprises two parallel energy distribution systems composed of basic element and load element.

FIG. 9 shows an exemplary embodiment in which the circuit arrangement comprises two energy distribution systems EVN1 and EVN2 connected in parallel with the energy source Q. Each energy distribution system EVN1, EVN2 is designed, merely by way of example, as illustrated in FIG. 7. It goes without saying that each energy distribution system EVN1 could also consist of any of the above-described modifications. In this variant, it is expedient if the first intermediate circuit energy storage elements of the basic elements of the two energy distribution systems EVN1, EVN2 are electrically connected to the energy source Q by the control device at different times. As a result of this, it is possible for the loading of the energy source Q to be balanced. The balancing increases if more energy distribution systems are connected in parallel.

The procedure according to the invention makes it possible to implement electrical insulation by highly-efficient semiconductor switch elements at high switching frequency. In this connection, the circuit converts voltage or current between the input and output to one another as desired. The circuit isolates two electrical energy circuits from one another, which optionally may be configured as input circuit or output circuit. The transfer of energy is in this case based on at least two energy storage elements which are not transformers. Although not compulsory, the use of magnetic energy storage elements is preferred.

The arrangement may be implemented independently of a topology, for example the known T shape or H shape. The energy transfer takes place in this case between the intermediate circuit energy storage elements in clearly defined, separate points in time. In this connection, the energy circuits are electrically isolated at all times and therefore also electrically decoupled.

List of reference signs

| | |
|---|---|
| GE | basic element |
| LE | load element |
| LE1 | load element |
| LE2 | load element |
| ZE | intermediate element |
| ZE1 | intermediate element |
| ZE2 | intermediate element |
| EVN | energy distribution system |
| EVN1 | energy distribution system |
| EVN1 | energy distribution system |
| Q | energy source |
| Ea | first intermediate circuit energy storage element |
| Eb | second intermediate circuit energy storage element |
| V | consumer |
| Sa1 | first switch element |
| Sa2 | first switch element |
| Sm1 | second switch element |
| Sm2 | second switch element |
| Sm3 | switch element |
| Sb1 | third switch element |
| Sb2 | third switch element |
| Ka | energy circuit |
| Km | energy circuit |
| V | consumer |
| V' | consumer |
| fa1 | control signal for first switch element Sa1 |
| fa2 | control signal for first switch element Sa2 |
| fb1 | control signal for third switch element Sb1 |
| fb2 | control signal for third switch element Sb2 |
| fm1 | control signal for second switch element Sm1 |
| fm2 | control signal for second switch element Sm2 |
| Em | energy storage element |
| SPm | inductance |
| Cm | capacitor |
| a1 | connection |
| a2 | connection |
| z1 | connection |
| z2 | connection |
| zb1 | connection |
| zb2 | connection |
| m1 | connection |
| m2 | connection |
| T1 | first period |
| T2 | second period |
| T3 | third period |
| T4 | fourth period |
| T5 | first stop period |
| T6 | second stop period |
| t0 | time instant |
| t1 | time instant |
| t2 | time instant |
| t3 | time instant |
| t4 | time instant |

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A circuit arrangement for transferring energy, comprising:
an energy source;
a control device;
at least one energy distribution system, wherein each energy distribution system comprises a basic element and at least one load element, wherein (i) the basic element comprises a first intermediate circuit energy storage element which is electrically connectable to or disconnectable from the energy source via two first controllable switch elements by the control device to form a first energy circuit, and (ii) the at least one load element comprises an energy consumer which is electrically connectable to or disconnectable from the connections of the first intermediate circuit energy storage element via two second controllable switch elements by the control device to form a second energy circuit, wherein the control device actuates the first and second switch elements of the respective energy distribution system such that energy is transferred from the energy source to the energy consumer or vice versa, wherein at no time is there a direct conducting connection between the energy source and the energy consumer, wherein one or more of the energy distribution systems has at least one intermediate element which is connected between the basic element and the at least one load element, and wherein each intermediate element comprises a second intermediate circuit energy storage element, wherein each second intermediate circuit energy storage element is electrically connectable to or disconnectable from the two connections of the respectively preceding first or second intermediate circuit energy storage element, the respectively subsequent second intermediate circuit energy storage element or the at least one energy consumer via two third controllable switch elements by the control device to form a respective second energy circuit.

2. The circuit arrangement according to claim 1, wherein two or more intermediate elements are connected in parallel with the basic element or a preceding intermediate element.

3. The circuit arrangement according to claim 1, wherein two or more load elements are connected in parallel with the basic element or with one of the intermediate elements.

4. The circuit arrangement according to claim 1, wherein a switch element is connected in parallel with the first intermediate circuit energy storage element.

5. The circuit arrangement according to claim 1, wherein a respective switch element is connected in parallel with at least one of the second intermediate circuit energy storage elements.

6. The circuit arrangement according to claim 1, wherein at least two energy distribution systems are connected in parallel with the energy source.

7. The circuit arrangement according to claim 6, wherein the first intermediate circuit energy storage elements of the basic element of the at least two energy distribution systems are electrically connected to the energy source at different times.

8. The circuit arrangement according to claim 1, wherein the control device switches the connection between the energy source and the energy consumer by selective actuation of the pairs of switches of the basic element, the optional intermediate element and the load element during operation to be conducting and blocking such that, at any given instant, at least one of the pairs of switches is blocking.

9. The circuit arrangement according to claim 1, wherein the control device switches the connection between the energy source and the energy consumer by selective actuation of the pairs of switches of the basic element, the optional intermediate element and the load element to be conducting and blocking such that an energy packet is transferrable from the energy source via the first intermediate circuit store and the optional second intermediate circuit store or stores to the energy consumer, or vice versa.

10. The circuit arrangement according to claim 8, wherein the control device switches the connection between the energy source and the energy consumer by selective actuation of the switch pairs of the basic element, the optional intermediate element and the load element to be conducting and blocking such that an energy packet is transferrable from the energy source via the first intermediate circuit store and the optional second intermediate circuit store or stores to the energy consumer, or vice versa.

11. The circuit arrangement according to claim 1, wherein a direction of energy transport between the energy circuits is reversible as desired by dynamic matching of the actuation of the pairs of switches of the basic element, the optional intermediate element and the load element by the control device.

12. The circuit arrangement according to claim 1, wherein the first intermediate circuit energy storage element and/or the at least one second optional intermediate circuit energy storage element comprises in each case at least one inductance and/or at least one capacitor.

13. The circuit arrangement according to claim 1, wherein the load element comprises at least one energy storage element in addition to the energy consumer.

14. A circuit arrangement for transferring energy, comprising:
an energy source;
a control device;
at least one energy distribution system, wherein each energy distribution system comprises a basic element and at least one load element, wherein
(i) the basic element comprises a first intermediate circuit energy storage element which is electrically connectable to or disconnectable from the energy source via two first controllable switch elements by the control device unit to form a first energy circuit, and
(ii) the at least one load element comprises an energy consumer which is electrically connectable to or disconnectable from the connections of the first intermediate circuit energy storage element via two second controllable switch elements by the control device to form a second energy circuit,
wherein the control device actuates the first and second switch elements of the respective energy distribution system such that energy is transferred from the energy source to the energy consumer or vice versa, wherein at no time is there a direct conducting connection between the energy source and the energy consumer,
wherein the load element comprises at least one energy storage element in addition to the energy consumer, and
wherein the energy storage element of the load element is an inductance which is connected in series with the consumer, wherein the series circuit composed of the energy storage element inductance and the energy consumer is connected in parallel with a fourth switch element.

15. A circuit arrangement for transferring energy, comprising:
an energy source;
a control device;
at least one energy distribution system, wherein each energy distribution system comprises a basic element and at least one load element, wherein
(i) the basic element comprises a first intermediate circuit energy storage element which is electrically connectable to or disconnectable from the energy source via two first controllable switch elements by the control device unit to form a first energy circuit, and
(ii) the at least one load element comprises an energy consumer which is electrically connectable to or disconnectable from the connections of the first intermediate circuit energy storage element via two second controllable switch elements by the control device to form a second energy circuit,
wherein the control device actuates the first and second switch elements of the respective energy distribution system such that energy is transferred from the energy source to the energy consumer or vice versa, wherein at no time is there a direct conducting connection between the energy source and the energy consumer,
wherein the load element comprises at least one energy storage element in addition to the energy consumer, and
wherein the energy storage element of the load element is a charge store which is connected in parallel with the energy consumer.

16. The circuit arrangement according to claim 1, wherein, the first, second and third switch elements are semiconductor switch elements.

17. The circuit arrangement according to claim 16, wherein the first, second, and third switch elements are MOSFETs or HEMTs.

18. The circuit arrangement according to claim 1, wherein the first, second and third switch elements are constructed from wide-bandgap materials.

19. The circuit arrangement according to claim 18, wherein the first, second, and third switch elements are constructed from GaN or SiC.

* * * * *